Figure 1:
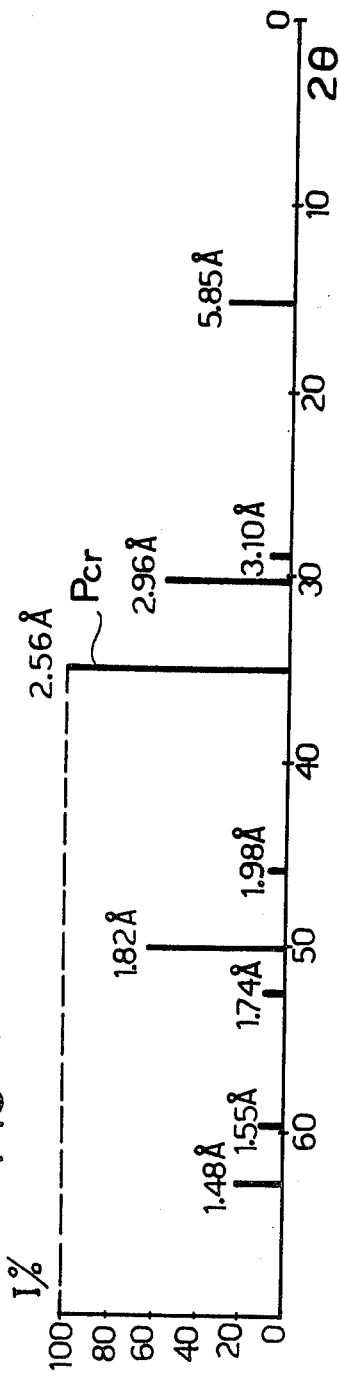

United States Patent [19]  [11]  4,421,674
Invernizzi et al.  [45]  Dec. 20, 1983

[54] SUPPORTED CATALYSTS FOR THE POLYMERIZATION OF ETHYLENE

[75] Inventors: Renzo Invernizzi, Milan; Ferdinando Ligorati, Usmate; Maurizio Fontanesi, Concorezzo; Roberto Catenacci, Milan, all of Italy

[73] Assignee: Euteco Impianti S.p.A., Milan, Italy

[21] Appl. No.: 376,727

[22] Filed: May 10, 1982

[30] Foreign Application Priority Data

May 21, 1981 [IT] Italy ............................... 21881 A/81

[51] Int. Cl.$^3$ ............................. C08F 4/02; C08F 4/64
[52] U.S. Cl. .................................... 502/154; 526/125; 502/169
[58] Field of Search ...................................... 252/429 B

[56] References Cited

U.S. PATENT DOCUMENTS 3,953,414  4/1976  Galli et al. .................. 252/429 B X
4,111,835  9/1978  Foschini et al. ............ 252/429 B X
4,226,963  10/1980 Giannini et al. ............ 252/429 B X
4,347,162  8/1982  Invernizzi et al. .............. 252/429 B Primary Examiner—Patrick Garvin
Attorney, Agent, or Firm—Bernard, Rothwell & Brown

[57] ABSTRACT

A process for the preparation of a catalyst which is highly active in the polymerization of gaseous ethylene is described the process comprising the steps of spray drying an ethanolic solution of $MgCl_2$ to obtain $MgCl_2$ particles of from 3 to 100 microns in size and with a residual alcoholic OH-groups content of from 1.5% to 20% by wt., the $MgCl_2$ in said particles having an X-ray spectrum with a maximum peak at 10.8 angstrom, reacting said particles with a titanium halide in liquid or vapor phase and mixing the obtained reaction product with an alkylaluminium or an alkylaluminium halide in such amount to obtain an atomic ratio Al:Ti of from 100:1 to 5,000:1.

7 Claims, 2 Drawing Figures

SUPPORTED CATALYSTS FOR THE POLYMERIZATION OF ETHYLENE

The present invention relates to a process for the preparation of a supported catalyst which is extremely active in processes for the low pressure polymerization of ethylene.

It is known that alpha-olefins can be polymerized by means of low-pressure, Ziegler processes. For this purpose catalysts are used which are generally constituted by a compound of an element of Subgroups IV to VI of the periodic system (transition metal compounds) mixed with an organometallic compound, or hydride, of an element from Groups I to III of the periodic system, the reaction being carried out in suspension, in solution or in the gaseous phase.

Catalysts are also known in which the transition metal compound is fixed to a solid support, of an organic or inorganic nature, which may have been treated physically and/or chemically.

Examples of solid supports are oxygenated compounds of divalent metals, such as: oxides; oxygenated and carboxylated inorganic salts (U.K. Pat. No. 1,140,649). Other supports used in the art are hydroxychlorides of divalent metals (Belgian Pat. No. 650,697 and French Pat. No. 1,448,320). Generally the catalysts which use these supports require rather high pressures for the polymerization and/or give relatively low yields of the olefin polymer.

The use of magnesium chloride as support for polymerization catalysts for alpha-olefins has been known for some time in the art and is, for example, described in U.S. Pat. No. 2,981,725. Since this Patent, magnesium chloride has been used, for the most part, in an activated form so as to make it more reactive towards the transition metal compound. Among the activation methods which have been suggested are grinding decomposition of RMgCl type compounds (where R stands for an organic radical), dissolution in an inert solvent followed by evaporation of the said solvent, and contact with organic compounds having electron-donor properties. On this subject reference should be made to the specifications of U.K. Pat. Nos. 1,286,867, 1,292,853, 1,305,610 and 1,314,258 and to the specification of Italian Pat. No. 869,291. The use of activated magnesium chloride has made it possible to produce polymerization catalysts for alpha-olefins which are much more active, even at relatively low polymerization pressures, for example in the range 5 to 10 atmospheres 4.9–9.8 bar. The disadvantages of these catalysts lie in long and laborious treatments needed to activate the magnesium chloride and in unsatisfactory reactivity of the magnesium chloride, activated by the above methods, towards the transition metal compound. The reaction between these two components is, indeed, carried out at high temperatures, over long periods of time, with a large excess of the transition metal compound being used compared to the quantity which becomes fixed to the support. Thus, it is difficult to bind an exactly metered quantity of the transition metal compound to the support and, in addition, it is necessary to recover and purify the excess reagent.

In our copending U.S. application Ser. No. 241,288, filed Mar. 6, 1981, now U.S. Pat. No. 4,347,162, granted Aug. 31, 1982, we have disclosed a new type of support, consisting of a fluorine compound and magnesium chloride. This support is particularly active in the reaction with the transition metal compound and solves many of the problems above. However, the use of fluorine compounds complicates the process of preparation of the support and involves risks of corrosion. In the practice of this invention preferably no fluorine compounds are used.

From a technical point of view, there is interest in catalysts which allow the olefin polymer to be obtained directly in the form of regular granules, of a size which would render superfluous the usual treatment of melting and granulating the polymer resulting from the polymerization stage. In addition, there is interest in catalysts which are able to polymerize alphaolefins at pressures below about 5 atmospheres (4.9 bar) with polymerization activities such as to render superfluous the separation of the catalytic residues from the olefin polymer. The catalysts of the known art mentioned above do not give this desired combination of services.

It has now been found that it is possible to polymerize ethylene to give extremely high yields of the olefin polymer, even at pressures below about 5 atmospheres (4.9 bar), by carrying out the reaction in the presence of a polymerization catalyst supported on an activated magnesium chloride support having the constitution and characteristics given below. It has also been found that, with the aid of the said catalyst, it is possible to obtain the olefin polymer directly in the form of regular, free-flowing granules of a size suitable for subsequent working and conversion.

One object of the present invention is therefore, a process for obtaining a supported polymerization catalyst which is highly active in the polymerization of ethylene, even at pressures below about 5 atmospheres (4.9 bar), and which is capable of producing a polymer in the form of free-flowing granules.

Another object of the invention consists of processes for the polymerization of ethylene which make use of the said supported catalyst.

Other objects of the invention will become apparent from the description and experimental examples which follow.

Accordingly, the invention provides a process for the preparation of a catalyst which is active in the polymerization of gaseous ethylene at low pressure, characterized by the steps of:

(a) providing a solution consisting of $MgCl_2$ dissolved in ethanol at a concentration of 100 to 300 g of $MgCl_2$ per liter of solution, having a water content not exceeding 5% by wt.;

(b) spray drying said solution by spraying the latter into a flow of substantially anhydrous gaseous nitrogen having a purity of at least 99.9% and having an inlet temperature below 280° C. while controlling the flows of said nitrogen and of said solution so that the outlet temperature of the gaseous mixture is by at least 40° C. lower than the inlet temperature and that the ethanol is not completely evaporated, to obtain $MgCl_2$ particles of spherical form and of a size in the range of from 3 to 100 microns with a residual alcoholic hydroxyl content of from 1.5% to 20% by wt., the solid $MgCl_2$ in said particles having an X-ray spectrum in which the maximum peak at 2.56 angstrom characteristic of crystalline $MgCl_2$ is practically absent and a new maximum peak at about 10.8 angstrom is present;

(c) reacting said $MgCl_2$ particles with a titanium halide, said halide being in the vapour or liquid form, optionally diluted with an inert, vaporizable solvent, at a temperature of from 20° to 100° C., the reaction time being in the range of from 2 to 60 minutes, while maintaining the weight ratio between the titanium halide and the MgCl$_2$ particles in the reaction zone in the range of from 0.001:1 to 2:1;

(d) recovering by physical means the reaction product particles when the latter contains from 0.7% to 12% by wt. (expressed as titanium) and on dry basis of titanium chemically linked to the solid;

(e) mixing the said reaction product particles with an organometallic compound selected from the group consisting of alkylaluminium or halides of alkylaluminium, in the same solvent used for the polymerization of ethylene, at room temperature and controlling the respective amounts so as to have in the mixture an atomic ratio between Al and Ti of from 100:1 to 5,000:1.

The catalyst obtained according to this invention is constituted by:

(A) an alkylaluminium or a halide of alkylaluminium and (B) the reaction product of a titanium halide with a support material, the said support material being MgCl$_2$ particles of spherical form and of size of from 3 to 100 microns, obtained by spray drying of an ethanolic solution of MgCl$_2$, and having a residual alcoholic hydroxyl content of from 1.5% to 20% by wt., the solid MgCl$_2$ in said particles having an X-ray spectrum in which the maximum peak at 2.56 angstroms, characteristic of crystalline MgCl$_2$ is practically absent and a new maximum peak at about 10.8 angstrom is present.

Figure 2:
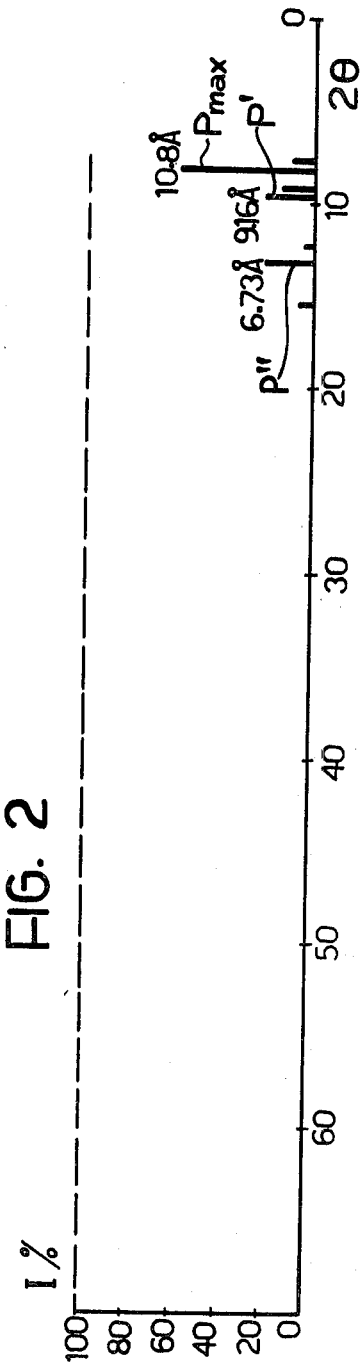

In the appended drawing:

FIG. 1 is a diagram showing a typical X-ray diffraction spectrum of crystalline magnesium chloride, wherein 100% intensity (1%) is attributed to the maximum peak $P_{cr}$ at 2,56 Å, and FIG. 2 is a similar diagram typical of the magnesium chloride in MgCl$_2$ particles according to this invention, wherein however the 100% intensity is still referred to $P_{cr}$ of FIG. 1 for comparison purposes.

THE SUPPORT AND ITS PREPARATION

The activated magnesium chloride, or support in the catalyst of the present invention, is the product of the spray drying of a solution of magnesium chloride in ethanol.

For this purpose, anhydrous magnesium chloride or magnesium chloride with a small water content is used, a total water content (water absorbed plus water of crystallization) of not more than 7% by weight being meant by this latter expression. A suitable magnesium chloride is, for example, that available commercially in the form of flakes, granules or powder, with a water content generally less than about 2% by weight.

The solution for spray drying is prepared by dissolving the magnesium chloride, having the characteristics indicated above, in ethanol until a concentration equal to or less than that of saturation at the temperature at which this is carried out is achieved. The ethanol is preferably anhydrous, or its water content is not more than 5% by weight. The ethanolic solution may also contain one or more vaporizable organic solvents, having a boiling point lower than that of ethanol, which are miscible with ethanol, and inert (unreactive) towards the other constituents of the solution. Examples of such solvents are aliphatic hydrocarbons such as pentane and hexane.

Preferably such added solvents are used in quantities of less than 50 parts by weight for every 100 parts by weight of the ethanol.

The magnesium chloride solution prepared in this manner is spray dried to form the activated magnesium chloride, or catalyst support, of the present invention. As is known, spray drying is a technique whereby a solution of a solute in a vaporizable solvent, or mixture of vaporizable solvents, is sprayed to form finely subdivided liquid droplets and these liquid droplets are brought into contact with hot, inert (unreactive) gas, either flowing in the same direction or in a counterflow, so as to evaporate the solvent, or solvents, and cause the solute to separate in the form of solid particles, generally of spherical form with uniform dimensions.

Spray drying apparatus is well known in the art.

In the spray drying of the ethanolic magnesium chloride solution according to the present invention, the operating conditions, such as the temperature of the gas at the inlet and at the outlet and the flow rates of the gas and of the solution are regulated so that the ethanol, and any added solvent, evaporate and the activated magnesium chloride is recovered in microspherical form with a residual alcoholic hydroxyl group content of at least 1.5% by weight. The values of all parameters for the spray drying cannot be fixed in advance because, other conditions being equal, they depend on the manner in which the gas and the solution are brought into contact (in flows in the same direction or in counter current), the geometry of the apparatus, its efficiency and other matters. Indicative values may be derived from the following specific embodiment:

the magnesium chloride is added to the ethanol and heated to 40° to 100° C. (typically under reflux or under pressure of nitrogen or another inert gas) until a solution is formed which contains from 100 g to 300 g of magnesium chloride per liter of solution;

this solution is sprayed in a generally downward direction to form liquid droplets with dimensions of the order of 0.5 to 70 microns by means of a nozzle or other equivalent device located at the top of a vertical, or substantially vertical spray drying chamber;

the liquid droplets are brought into intimate contact with gaseous nitrogen flowing in the same direction, the nitrogen preferably being extremely pure (about 99.9%; water content less than 5 ppm) and being fed to the top of the drying chamber, for example through the same feed nozzle as the solution;

furthermore, the operation is carried out with a temperature of the gaseous nitrogen flow at the inlet to the drying chamber of the order of 180° C. to 280° C., with a temperature of the gaseous flow at the outlet from the chamber of the order of 130° C. to 210° C., and with a temperature difference between the flows at the inlet and at the outlet of at least 40° C.

Within the limits of these conditions, solid MgCl$_2$ particles are separated in a cyclone at the bottom of the chamber and constitute the support for the catalyst, the characteristics of which are typically within the following range of values:

particle form: spherical with a size of from 3 to 100 microns, 90% or more of the particles having dimensional differences within a range of 10 microns;

bulk density of the particles: from 0.1 to 1 g/ml;

alcoholic hydroxyl group content: from 1.5 to 20% by weight;
specific area: less than or equal to 20 m²/g;
porosity: 0.5 to 1.2 ml/g.

The X-ray diffraction pattern of this solid magnesium chloride (drawing FIG. 2) does not show peaks typical of crystalline magnesium chloride (FIG. 1) but has a maximum peak P max. at about 10.8 Å and lesser peaks P', P" at about 9.16 and 6.73 Å.

The characteristics of the solid magnesium chloride according to the present invention are typical and are not found in other activated magnesium chloride supports of the known art. Thus, crystalline magnesium chloride, under X-ray examination, has a maximum peak Pcr at 2.56 Å. When crystalline magnesium chloride is ground, for example in a ball mill, a halo is found instead of the peak, the halo being broader the greater the degree of grinding. If this grinding is carried out in the presence of ethanol an activated magnesium chloride is obtained which, under the same tests, has a broadened halo between 2.56 Å and 2.96 Å. If the magnesium chloride is dissolved in ethanol and the ethanol is then evaporated from the solution by methods other than spray drying, an activated magnesium chloride is obtained which, under X-ray examination has a maximum peak at 13.09 Å.

Hence it is considered that the spray drying of ethanolic magnesium chloride solutions according to the present invention gives rise to a new and useful structure suitable as a support for catalysts for the polymerization of ethylene and for polymerization catalysts for alpha-olefins in general.

In addition, it must be pointed out that, when solutions of magnesium chloride in alcohols other than ethanol are subjected to spray drying, a spheroidal solid product is again formed with a particular spectrum under X-ray examination. Thus, for example, in the case of solutions of magnesium chloride in methanol, the solid obtained by spray drying has a maximum peak at about 7.76 Å and, in the case of solutions in butanol, the maximum peak appears at about 15.8 Å, peaks characteristic of crystalline magnesium chloride being absent in both cases. However magnesium chloride activated by these methods does not fall within the scope of the present invention in that it has a lower reactivity towards the titanium halides and, above all, catalysts which make use of such support have a remarkable lower activity in the polymerization of ethylene at low pressures.

The preferred characteristics of the support for the catalysts of the present invention are as follows:
particle form: spherical with a size of from 10 to 50 microns;
bulk density: from 0.2 to 0.5 g/ml;
alcoholic hydroxyl group content: from 3 to 15% by weight;
specific area: less than or equal to 6 m²/g;
porosity: 0.7 to 0.85 ml/g.

The preferred values of the alcoholic hydroxyl group content and of the particle size of the support are those most able to give catalysts for polymerizing ethylene to directly obtain regular, free-flowing granules of polymer suitable for subsequent working without the necessity of melting and granulation.

According to another embodiment of the present invention the $MgCl_2$ particles may contain a spheroidal core or nucleous of porous silica or alumina. To obtain such particles an ethanolic solution of magnesium chloride, optionally containing one or more added solvents, is spray dried as specified above, there being suspended in the said solution microspheroidal particles (dimensions of from 10 to 80 microns) of a mineral solid such as silica or alumina.

Thus a spherical support is formed having a core constituted by the microspheroidal solid coated with a layer of solid magnesium chloride. Conveniently the size of the core is of the order of 10 to 80% by weight of the particle of the support.

According to a further embodiment, the ethanolic solution of magnesium chloride is spray dried onto a fluidized bed of spheroidal particles of silica, alumina or the like. Spherical particles are again obtained, with cores of silica or alumina, the size of the core in the particle being kept within the range of values indicated above.

When the particles contain a core, the characteristics of the support, particularly the specific surface, are influenced by the nature of the silica or of the alumina, used. The silica or alumina used for the cores is of the type commonly used as catalyst support, typically with a surface area of from 150 to 250 sq.m/g, a porosity of from 1 to 3 ml/g.

Component (B) of the Catalyst and Its Preparation

In the preparation of the component (B) of the catalyst of the present invention, the magnesium chloride particles are brought into contact, under reaction conditions, with a titanium halide and reacted therewith.

Specific examples of these compounds are $TiCl_4$ and $TiBr_4$. The compound most preferred is titanium tetrachloride.

During contact with the magnesium chloride particles, the titanium halide may be in the vapour state (in the case of easily vaporizable liquids), in the liquid state (when they exist in this state as the temperatures at which the reaction is carried out), optionally diluted with a vaporizable solvent which is inert (unreactive) towards the other constituents taking part in the reaction, or in the form of a solution (in the case of solids) in a vaporizable, inert, organic solvent. Vaporizable, inert, organic solvents which are suitable for this purpose are pentane, hexane, cyclohexane and heptane.

The magnesium chloride particles according to the present invention have a high reactivity towards the titanium halides. For this reason any method of bringing a gas or liquid into contact with a granular solid may be used.

If titanium tetrachloride is used periods of from 2 to 60 minutes at temperatures from ambient (20° to 25° C.) up to 100° C. are generally required to bond the titanium compound to the support, the titanium compound being used in quantities such as to maintain the weight ratio between the titanium halide and the $MgCl_2$ particles in the reaction zone from 0,005:1 to 2:1. In general the reaction is carried out until the titanium is present in the component (B) of the catalyst in quantities (expressed in terms of the metal) of from 0.7% to 12% by weight on dry basis.

Catalysts which are particularly useful for the purposes of the present invention are those in which the component (B) is obtained from magnesium chloride particles and titanium tetrachloride and contains a quantity of titanium (expressed in terms of the metal) of about 1 to 5.5% by weight.

A typical method of preparing the said component (B) consists of maintaining the $MgCl_2$ particles in fluidized form by means of a flow of inert gas (for example nitrogen), and spraying liquid titanium tetrachloride, optionally diluted with an inert, vaporizable solvent, onto the fluidized particles. It is also possible to feed to the MgCl$_2$ particles a flow of the inert gas containing titanium tetrachloride vapour.

When magnesium chloride particles are used with an alcoholic hydroxyl group content of 3 to 15% by weight and a quantity of titanium tetrachloride of about 1 to 5.5% by weight (expressed in terms of the metal) is bonded thereto, the component (B) of the catalyst which is obtained typically has a specific area in the range of 30 to 120 m$^2$/g and a porosity in the range of 0.7 to 1.3 ml/g.

It has been found experimentally that the magnesium chloride particles, obtained according to the present invention, have a relatively low specific area but the specific area value increases considerably on treatment of the support with the titanium tetrachloride. Under the same circumstances the porosity value increases only slightly. This behaviour is typical of the catalyst of the present invention. It has in fact been found that, in the activated magnesium chloride according to the known art, a slight diminution only of the specific area value is usually found after the treatment with titanium tetrachloride. In the case of MgCl$_2$ particles with cores of silica or alumina, the specific area is influenced by the characteristics of the material constituting the core and the value of the said specific area, and also of the porosity, tends to increase as a result of the treatment with titanium tetrachloride. In every case, the component (B) of the catalyst is in the form of spherical granules of a size similar to that of the silica or alumina granules.

It is known that, in order to react magnesium chloride supports, activated according to the known art, with titanium tetrachloride, grinding in specific apparatus (for example ball mills) for very long periods of time was necessary or the said reaction was carried out at 80° to 130° C. for one or more hours, in every case with a large excess of titanium tetrachloride. In comparison with this circumstances, the reactivity of the magnesium chloride particles according to the present invention is surprisingly high, even higher than the MgCl$_2$ fluorine compound supports, and allows the preparation of the component (B) of the catalyst to be greatly simplified.

Component (A) of the Catalyst

The component (A) of the catalyst of the present invention is constituted by an alkyl aluminium or by a halide of alkyl aluminium. The best results are achieved with trialkylaluminium compounds, especially those in which the alkyl radical contains from 2 to 4 carbon atoms.

Specific examples are Al(C$_2$H$_5$)$_3$, Al(iso-C$_4$H$_9$)$_3$, and Al(C$_2$H$_5$)$_2$Cl.

The Catalyst and Its Use in the Polymerization of Ethylene

The catalyst of the present invention is active in the polymerization of ethylene. Copolymers of ethylene with other alpha-olefins, such as propylene and 1-butene may also be prepared with the aid of the said catalyst.

In these polymerization reactions, the relative proportions of the components (A) and (B) of the catalyst may be varied within wide limits, an aluminium/titanium atomic ratio greater than about 2.5:1 is generally used.

The polymerization may also be carried out in the gaseous phase or in suspension in an inert organic solvent such as hexane, heptane, cyclohexane.

The polymerization temperatures may generally be varied from 60° to 100° C. with ethylene pressures of from 1 to 20 atmospheres (0.98–19.6 bar). The preferred temperatures are of the order of 90° to 95° C. and the preferred ethylene pressures are of the order of 3 to 3.5 atmospheres (2.94–3.43 bar). Regulation of the molecular weight of the olefin polymer is made possible both by means of the characteristics of the support used for the catalyst and by means of the addition of one or more chain terminators such as hydrogen, alcohols, carbon dioxide, alkylzinc and alkylcadmium compounds.

In the polymerization of ethylene, the catalysts of the present invention display a high activity and a very high productivity in the formation of the olefin polymer, so that the separation of the catalytic residues from the polymer is rendered superfluous. Indeed the residual quantity of titanium in the polymer is usually of the order to 1 ppm and in the best cases is less than 0.5 ppm.

In addition the regular spherical form of the component (B) of the catalyst of the present invention makes the ethylene polymer obtainable in the form of regular, free-flowing granules with density characteristics such as to make it useable directly in the type of workings to which it is usually subjected. The melting and granulation stage subsequent to the polymerization stage in usual processes for the production of olefin polymers is thus avoided.

In the production of polyethylene with partial pressures of ethylene of 3 to 3.5 atmospheres (2.94–3.42 bar), and with partial pressures of hydrogen of 1.5 to 2 atmospheres (1.47–1.96 bar), at a temperature of the order of 90° to 95° C., the catalysts of the present invention have shown productivity values of up to more than 40 Kg of polyethylene per gram of catalyst and activity values of up to more than 500,000 g of polyethylene per gram of titanium per hour and per 0.98 bar of ethylene.

The ethylene polymers obtained with the aid of the polymerization catalysts of the present invention have characteristics of the melt-index of about 0.1 to 20 g/10 min., a crystallinity of from 50 to 84% and a density of from 0.94 to 0.97 g/ml depending on the conditions chosen to obtain them. Given the wide range of the melt index, it is possible to produce polyethylenes suitable for any type of working, such as extrusion and blow-moulding.

With regard to the grain size of the obtained polyethylenes, this characteristic depends mainly on the particle size of the support used in the preparation of the catalyst and it is thus possible to regulate the size of the polymer granules within a wide range, such as from 100 to 2,000 microns. With regard to the grain size distribution, this is contained within±25% of the average value, with about 90% of the granules having a size within±10% of the said average value.

The experimental examples which follow are illustrative and non-limiting of the invention. The relevant data and calculations are summarized in Table 1.

EXAMPLE 1

(a) Preparation of the Support

In order to prepare the catalyst support a commercial magnesium chloride in the form of flakes having a size of from 0.1 to 2 mm, and with a water content of 0.7% by weight is used.

This magnesium chloride is placed in essentially anhydrous ethanol (having a water content less than 0.2% by weight) and is heated to 90° C. so as to form a solution with a concentration of the salt of about 250 g/liter.

This solution is spray dried in laboratory spray drying apparatus of the Italian company GASTALDI, comprising a vertical drying chamber having, at the top, a nozzle for spraying the solution and for the gaseous flow, and terminating at the bottom with a cyclone for collecting the solid particles and with means for discharging the gaseous flow.

More particularly, the solution which is preheated to about 90° to 100° C. is fed to the top of the evaporation chamber and is reduced to finely divided liquid droplets by passage through the nozzle together with a flow of nitrogen.

For this purpose pure, gaseous nitrogen (99.9% pure with a moisture content less than 5 ppm) is used. The temperature of the nitrogen flow at the inlet is 210° C. and the outlet is 140° C., 8 m³ of nitrogen (evaluated under normal conditions) being supplied for every 500 ml of ethanol to be evaporated.

Under these conditions a particulate solid is collected at the bottom of the evaporation chamber with the following characteristics:

particle form: spherical, with about 90% of the particles having a size within the range of from 5 to 10 microns;
bulk density of the particles: 0.32 g/ml;
alcoholic hydroxyl group content: 13.3% by weight;
specific area: 4.5 m²/g;
porosity: 0.7 ml/g;
X-ray diffraction pattern; maximum peak at about 10.8 Å and lesser peaks at about 9.16 and 6.73 Å; no peaks of crystalline magnesium chloride.

This particulate solid is used as the support for the preparation of the component (B) of the catalyst.

(b) Preparation of the Component (B) of the Catalyst

The activated magnesium chloride support (5 g) prepared as described in the preceding section (a), is placed in a vertical tubular glass reactor having an internal diameter of 30 mm, provided at the bottom with a porous septum. A flow of pure nitrogen (about 99.9% pure, containing less than 5 ppm of water) saturated with titanium tetrachloride vapour is supplied to the bottom of the reactor, through the porous septum, at the ambient temperature (20° C.).

The reaction is carried out for 1 hour at 20° C. with the support particles being fluidized by means of the gaseous flow supplied at a rate of 150 liters per hour. Under these conditions the titanium tetrachloride becomes fixed to the support and, at the end of the reaction, the component (B) of the catalyst is obtained with the following characteristics:

form and size of the particles: similar to those of the support used;
titanium content (in terms of the metal): 5.3% by weight;
specific area: 69 m²/g;
porosity: 0.85 ml/g.

(c) Preparation of the Catalyst and Polymerization of Ethylene

Anhydrous n-hexane (2 liters) is placed in a stainless steel polymerization reactor provided with an agitator (rate of 700 rpm) and an oil heating jacket.

To the reactor is added triethylaluminium (1 ml) and the component (B) of the catalyst (14 mg) prepared as described in the preceding section (b). Gaseous ethylene and gaseous hydrogen are fed into the reactor so to adjust their partial pressures at 3.5 atmospheres (3.43 bar) and at 1.5 atmospheres (1.47 bar), respectively, and the polymerization is carried out at 95° C., gaseous ethylene being fed into the reactor so as to maintain its partial pressure constant. After one hour the polymerization is stopped and the ethylene polymer is recovered from the reactor with the following characteristics:

melt-index: 2.0 g/10 minutes (ASTM D-1238);
density: 0.968 g/ml (DIN 53479);
physical form of the polymer: free-flowing granules with a size of 200 to 330 microns;
bulk density: 0.29 g/ml.

The following values were also determined:
productivity: 45 Kg of polyethylene per gram of catalyst;
activity: 242,600 g of polyethylene per gram of titanium per hour and per 0.9807 bar of ethylene. The same units for productivity and activity will be used in all the following examples.

EXAMPLE 2 (COMPARISON)

The commercial magnesium chyloride of Example 1 is ground in a ball mill for 200 hours and thus an activated magnesium chloride is obtained having the following characteristics:

particle form: irregular with an average particle size of less than 5 microns;
specific area: 30 m²/g;
X-ray diffraction pattern: maximum peak typical of crystalline magnesium chloride at 2.56 Å broadened to form a halo.

The magnesium chloride activated in this manner (5 grams) is brought into contact with titanium tetrachloride (100 grams) and heated to 130° C. for 4 hours. After separation of the excess titanium tetrachloride and washing of the residual solid with anhydrous heptane (containing less than 1 ppm of water), a component of the catalyst is obtained with a titanium content (expressed in terms of the metal) of 0.9% by weight.

This component (14 mg) is mixed with 1 ml triethylaluminium and ethylene is polymerized as described in Example 1. An ethylene polymer is obtained with the following characteristics:

melt-index: 0.25 g/10 minutes (ASTM D-1238)
density: 0.95 g/ml (DIN 53479);
physical form of the polymer: irregular granules.
The following values were also determined:
productivity: 2
activity: 63,500

EXAMPLE 3 (COMPARISON)

The commercial magnesium chloride of Example 1 is ground in a ball mill in the presence of essentially anhydrous ethanol (water content less 0.2% by weight) in a preparation of 20 parts by weight for every 100 parts by weight of magnesium chloride. The grinding is continued for 200 hours and thus an activated magnesium chloride is obtained having the following characteristics:
- particle form: irregular with an average particle size less than 3 microns;
- alcoholic hydroxyl group content: 6.7% by weight;
- specific area: 40 m$^2$/g;
- X-ray diffraction pattern: a halo was found which was shifted downwards to between 2.5 and 2.96 Å.

The magnesium chloride activated in this manner (5 g) is brought into contact with titanium tetrachloride (100 g) and heated to 130° C. for 4 hours. After separation of the excess titanium tetrachloride and washing of the residual solid with anhydrous heptane (water content of less than 1 ppm), a component of the catalyst is obtained with a titanium content (expressed in terms of the metal) of 2.5% by weight.

This component (14 mg) is mixed with 1 ml triethylaluminium and ethylene is polymerized as described in Example 1. An ethylene polymer is obtained with the following characteristics:
- melt-index: 0.4 g/10 minutes (ASTM D-1238);
- density: 0.955 g/ml (DIN 53479);
- physical form of the polymer: irregular granules.

The following values were also determined:
- productivity: 6.5
- activity: 74,300

EXAMPLE 4 (COMPARISON)

The commercial magnesium chloride of Example 1 is dissolved in essentially anhydrous ethanol (water content less than 0.2% by weight) and is heated to 100° C. to form a solution with a concentration of the salt of 300 g/liter.

The solvent is evaporated by agitation at 130° C. for 10 hours. Thus an activated magnesium chloride is separated having the following characteristics:
- particle form: needles with an average size of 30 microns;
- alcoholic hydroxyl group content: 10% by weight;
- specific surface: 50 m$^2$/g;
- X-ray diffraction pattern: a maximum peak is detected at 13.09 Å.

The magnesium chloride thus activated (5 g) is brought into contact with titanium tetrachloride (100 g) and heated to 100° C. for 4 hours. After separation of the excess titanium tetrachloride and washing of the residual solid with anhydrous heptane (water content less than 1 ppm) a component of the catalyst is obtained with a titanium content (expressed in terms of the metal) of 3% by weight. This component (14 mg) is mixed with 1 ml triethylaluminium and ethylene is polymerized as described in Example 1. An ethylene polymer is obtained with the following characteristics:
- melt-index: 1 g/10 minutes (ASTM D-1238);
- density: 0.96 g/ml (DIN 53479);
- physical form of the polymer: irregular, elongate granules.

The following values were also determined:
- productivity: 9
- activity: 86,000

EXAMPLE 5

The commercial magnesium chloride of Example 1 is dissolved in essentially anhydrous ethanol (water content less than 0.2% by weight) at 60° C. until a salt concentration in the solution of 160 g/liter is achieved.

This solution is fed at the same temperature into industrial spray-drying apparatus of the "Closed Cycle Drying" type of the NIRO Company, operating with flows in the same direction and with total recovery of the evaporated organic solvent. In this apparatus the solution is reduced to liquid droplets, the apparatus being operated with an inlet temperature of the flow of gaseous nitrogen of 260° C. and an outlet temperature of the gaseous flow of 160° C., 40 liters/hour of the ethanolic magnesium chloride solution being supplied.

Under these conditions, a granular solid is collected at the bottom of the drier with the following characteristics:
- particle form: spherical, with about 90% of the particles within a size range of from 20 to 30 microns;
- apparent density of the particles: 0.25 g/ml;
- alcoholic hydroxyl group content: 6.65% by weight;
- specific area: 3 m$^2$/g;
- porosity: 0.85 ml/g;
- X-ray diffraction pattern: similar to that of the activated magnesium chloride of Example 1.

The activated magnesium chloride thus obtained is used as the support for preparing the component (B) of the catalyst.

More particularly, 5 g of the support are brought into contact with 2 ml (3.45 g) of dilute titanium tetrachloride in 100 ml of n-heptane. The reaction is carried out in suspension, the support and the titanium compound being reacted for 5 minutes at about 95° C. At the end of this period, the solid is separated by filtration and heated to 100° C. to remove the n-heptane completely.

The component (B) of the catalyst is obtained in this manner with the following characteristics:
- form and dimensions of particles: similar to those of the support used;
- titanium content (in terms of the metal): 2% by weight;
- specific area: 33 m$^2$/g;
- porosity: 1.0 ml/g;
- X-ray diffraction pattern: a peak is present at 10.8 Å with no other peaks.

4 mg of the component (B) of the catalyst are mixed with the component (A), that is, triethylaluminium (0.2 ml) in 2 liters of anhydrous n-hexane. Ethylene is polymerized with this catalyst in the manner described in Example 1. An ethylene polymer is obtained having the following characteristics:
- melt-index: 1.0 g/10 minutes (ASTM D-1238);
- density: 0.960 g/ml (DIN 53479);
- physical form of the polymer: free-flowing granules with a grain size of 600 to 900 microns;
- bulk density: 0.35 g/ml.

The following values were also determined:
- productivity: 27
- activity: 386,000.

EXAMPLE 6

The commercial magnesium chloride of Example 1 is dissolved in essentially anhydrous ethanol (water content less than 0.2% by weight) until a saturated solution is formed at 80° C. (210 g of magnesium chloride per liter of solution). The same quantity of weight as the dissolved magnesium chloride of spheroidal gamma-alumina, with a specific area of 180 m$^2$/g and a porosity of 2 ml/g is suspended in the said saturated solution.

This suspension is fed into the spray drier described in Example 1 at a rate of 200 ml/hour.

The drier is operated with a flow of gaseous nitrogen supplied to the inlet, in the same direction as the spray, at a temperature of 230° C. and with an outlet temperature of the gaseous flow of 160° C. The nitrogen is, moreover, supplied at a rate of 4 m³/hour (determined under normal conditions).

Under these conditions, a granular solid is separated at the foot of the drier with the following characteristics:

form of the particles: spherical, with more than 90% of the particles having a size in the range 80+5 microns;
constitution of the particles: the particles are constituted by a nucleus of gamma-alumina coated with a uniform layer of activated magnesium chloride, the alumina constituting about 50% by weight of the particles;
alcoholic hydroxyl group content: 4.4% by weight (with reference to the entire support);
specific area: 40 m²/g;
porosity: 0.6 ml/g.

The support (5 g) thus obtained is placed in a vertical tubular glass reactor having an internal diameter of 30 mm, provided with a porous septum at the bottom. A flow of pure nitrogen (about 99.9% pure, containing less than 5 ppm of water) saturated with titanium tetrachloride vapour is supplied to the bottom of the reactor through the porous septum for 60 minutes at 20° C., the particles of the support being fluidized by the gaseous flow which is supplied at a rate of 200 liters/hour. Under these conditions, the titanium tetrachloride becomes bound to the support and, at the end of the operation, the component (B) of the catalyst is obtained with the following characteristics:

form and dimensions of particles: similar to those of the support used;
titanium content (in terms of the metal): 3% by weight;
specific area: 50 m²/g;
porosity: 0.65 ml/g.

10 mg of the component (B) of the catalyst are mixed with the component (A), that is, triethylaluminium (0.5 ml) in 2 liters of anhydrous hexane. Ethylene is polymerized with this catalyst in the manner described in Example 1. An ethylene polymer is obtained having the following characteristics:

melt-index: 0.4 g/10 minutes (DIN 53735 E, with a load of 5 Kg); 0 g/10 minutes (ASTM D-1238);
density: 0.94 g/ml (DIN 53479);
physical form of the polymer: free-flowing granules with an average size of 2,000 microns;
bulk density: 0.4 g/ml.

The following values were also determined:
productivity: 15.6
activity: 148,500

EXAMPLE 7

The commercial magnesium chloride of Example 1 is placed in essentially anhydrous ethanol (water content of less than 0.2% by weight) and heated to 100° C. until a solution is obtained with a concentration of the salt of 300 grams per liter. This solution is fed into the commercial spray drying apparatus described in Example 5. This apparatus is operated with an inlet temperature of the gaseous nitrogen flow of 250° C. and a temperature of the gaseous flow at the outlet of 150° C., 50 liters/hour of the ethanolic solution of magnesium chloride being supplied. Under these conditions a granular solid is collected at the bottom of the drier having the following characteristics:

particle form: spherical with about 90% of the particles having a size of from 30 to 40 microns;
bulk density: 0.3 g/ml;
alcoholic hydroxyl group content: 10.72% by weight;
specific area: 4 m²/g;
porosity: 0.75 ml/g;
X-ray diffraction pattern: similar to that of the magnesium chloride of Example 1.

The activated magnesium chloride thus obtained is used as the support for preparing the component (B) of the catalyst. More particularly, 5 g of the support are brought into contact with 5 ml of titanium tetrachloride, diluted with 100 ml of anhydrous n-heptane (water content less than 1 ppm). This step is carried out in suspension, the support being reacted with the titanium compound for 30 minutes at about 95° C. At the end of this period, the solid is filtered, washed with anhydrous n-heptane (water content less than 1 ppm) and finally preserved in suspension in anhydrous n-heptane (5 g of component (B) for every 100 ml of n-heptane). The component (B) of the catalyst thus obtained has the following characteristics:

form and dimensions of the particles: similar to those of the support used;
titanium content (in terms of the metal): 3.2% by weight;
specific area: 66 m²/g;
porosity: 0.75 ml/g;
X-ray diffraction pattern: the peak at 10.8 Å is present with no other peaks.

0.05 ml of the suspension of component (B) (about 2.5 mg of the component (B) are mixed with the component (A) constituted by tri-isobutylaluminium (0.1 ml) in 2 liters of anhydrous n-heptane.

Ethylene is polymerized with the aid of this catalyst in the manner described in Example 1. A polymer is obtained with the following characteristics:

melt-index: 1.5 g/10 minutes (ASTM D-1238);
density: 0.963 g/ml (DIN 53479);
physical form of the polymer: free-flowing granules with a particle size of 1200 to 1600 microns;
bulk density: 0.25 g/ml.

The following values were also determined:
productivity: 64
activity: 571,000

EXAMPLE 8

Ethylene is polymerized for 1 hour at 100° C. with a pressure of 2.5 atmospheres (2.45 bar) of ethylene and 2.5 atmospheres (2.45 bar) of hydrogen with the catalyst of Example 7.

The polymer thus obtained has the following characteristics:

melt-index: 8 g/10 minutes (ASTM D-1238);
density: 0.97 g/ml (DIN 53479);
physical form of the polymer: free-flowing granules with an average particle size of 900 microns;
bulk density: 0.38 g/ml.

The following values were also determined:
productivity: 19.68
activity: 175,700

EXAMPLE 9

This example is carried out in a manner similar to Example 7, 30 liters per hour of the ethanolic solution of magnesium chloride being fed into the spray drier in which an inlet temperature of the gaseous flow of nitrogen of 280° C. and an outlet temperature of the gaseous flow of 180° C. are maintained.

Under these conditions a granular solid is obtained having the following characteristics:
  particle form: spherical, about 90% of the particles having a diameter of between 10 and 15 microns;
  bulk density: 0.2 g/ml;
  alcoholic hydroxyl group content: 3.7% by weight;
  specific area: 5 m²/g;
  porosity: 1 ml/g;
  X-ray diffraction pattern: similar to that of the activated magnesium chloride of Example 1.

The activated magnesium chloride thus obtained is treated with titanium tetrachloride as in Example 7.

The component (B) of the catalyst is thus obtained with the following characteristics:
  form and dimensions of the particles: similar to those of the support;
  titanium content (in terms of the metal): 0.8% by weight;
  specific area: 120 m²/g;
  porosity: 1.3 ml/g;
  X-ray diffraction pattern: the peak at 10.8 Å is present while the other peaks are absent.

Ethylene is polymerized with the use of this component (B) under the conditions of Example 7 and a polymer is obtained with the following characteristics:
  melt-index: 0.08 g/10 minutes (ASTM D-1238);
  density: 0.947 g/ml (DIN 53479);
  physical form of the polymer: free-flowing granules with a particle size of 270 to 400 microns;
  bulk density: 0.36 g/ml.

The following values were also determined:
  productivity: 19.6
  activity: 700,000

EXAMPLE 10 (COMPARISON)

10 grams of the activated magnesium chloride obtained in Example 5 are treated with 100 ml of vanadium oxychloride (VOCl$_3$) at 110° C. for 4 hours and the component (B) of the catalyst is obtained with 4% by weight of vanadium (in terms of the metal).

This component (B) (14 mg) is used to polymerize ethylene, together with the component (A), that is, triethylaluminium (1 ml), at 95° C. with an ethylene pressure of 10 atmospheres (9.81 bar) and with a hydrogen pressure of 4 atmospheres (3.92 bar).

A polymer is obtained with the following characteristics:
  melt-index: 0.3 g/10 minutes (DIN 53735 E);
  density: 0.955 g/ml (DIN 53479);
  physical form of the polymer: free-flowing granules with dimensions of 500 to 750 microns.

The following values were also determinated:
  productivity: 15.6
  activity: 39,000

EXAMPLE 11

20 g of spheroidal silica (AKZO F 7-type, average grain size 75 microns) are fluidized in a tubular cylindrical reactor with an internal diameter of 20 mm by means of a flow of pure, anhydrous nitrogen (purity of about 99.9% by weight, having a moisture content of less than 5 ppm) which is supplied to the foot of the reactor at a flow rate of 200 liter/hour and heated to 200° C. A saturated ethanolic solution of magnesium chloride at 100° C. (concentration of about 300 g/liter) is sprayed into the top of the reactor through a nozzle. Thus the conditions of a spray drier operating in counter-current are achieved in the presence of a bed of fluidized, solid particles.

The ethanolic magnesium chloride solution is sprayed until a weight ratio of MgCl$_2$/SiO$_2$ of 0.3:1 by weight is achieved in the fluidized particles.

The activated support is thus obtained, in the form of spherical particles which are very regular and have an average size of 90 microns. Furthermore the support has the following characteristics:
  alcoholic hydroxyl group content: 2% by weight (with respect to the entire support);
  specific area: 110 m²/g;
  porosity: 0.6 ml/g.

The support thus obtained (5 g) is treated with titanium tetrachloride as in Example 6 and the component (B) of the catalyst is obtained with the following characteristics:
  form and dimensions of the particles: similar to those of the support;
  titanium content (in terms of the metal): 1% by weight;
  specific area: 120 m²/g;
  porosity: 0.62 ml/g.

10 mg of the component (B) thus obtained are used to polymerize ethylene in the manner described in Example 7.

A polymer is obtained with the following characteristics:
  melt-index: less than 0.01 (DIN 53735E);
  density: 0.942 g/ml (DIN 53479);
  physical form of the polymer: free-flowing granules with an average particle size of 1,800 microns;
  bulk density: 0.4 g/ml.

The following values were also determined:
  productivity: 9.36
  activity: 267,000

EXAMPLE 12 (COMPARISON)

10 g of the support of Example 5 are treated with 100 ml of chromium oxychloride (CrO$_2$Cl$_2$) at 100° C. for 4 hours, the component (B) of the catalyst being obtained with a chromium content (in terms of the metal) of 2% by weight.

This component (B) is used to polymerize ethylene in the manner described in Example 10 and a polymer of ethylene having the following characteristics is obtained:
  melt-index: 0.3 g/10 minutes (ASTM D-1238);
  density: 0.95 g/ml (DIN 53479);
  physical form of the polymer: free-flowing granules with a particle size of 450 to 650 microns;
  bulk density: 0.38 g/ml.

The following values were also determined:
  productivity: 10
  activity: 50,000

TABLE 1

| (1) | (2) | (3) | (4) | (5) | (6) | (7) | (8) |
|---|---|---|---|---|---|---|---|
| | | | COMPONENT B PREPARATION | | | | |
| | Magnesium chloride particles | | Halogenated | reaction time | reac. temp. | halog.:MgCl$_2$ | |

TABLE 1-continued

| Ex. | type | Prep. method | OH % by wt. | comp. used | minutes | °C. | wt. ratio |
|---|---|---|---|---|---|---|---|
| 1 | no core | spray-drying | 13.3 | TiCl$_4$ | 60 | 20 | 0.0014 |
| 2 | no core | ball milling | n.d. | TiCl$_4$ | 240 | 130 | 20.0 |
| 3 | " | " | 6.7 | TiCl$_4$ | 240 | 130 | 20.0 |
| 4 | " | " | 10.0 | TiCl$_4$ | 240 | 100 | 20.0 |
| 5 | " | spray-drying | 6.65 | TiCl$_4$ | 5 | 95 | 0.6 |
| 6 | Al$_2$O$_3$co. | " | 4.4 | TiCl$_4$ | 60 | 20 | 0.0014 |
| 7 | no core | " | 10.72 | TiCl$_4$ | 30 | 95 | 1.58 |
| 8 | " | " | 10.72 | TiCl$_4$ | 30 | 95 | 1.58 |
| 9 | " | " | 3.7 | TiCl$_4$ | 30 | 95 | 1.58 |
| 10 | " | " | 6.65 | VOCl$_3$ | 240 | 110 | 18.29 |
| 11 | SiO$_2$co. | fluid bed | 2.0 | TiCl$_4$ | 60 | 20 | 0.0014 |
| 12 | no core | spray-drying | 6.65 | Cr$_2$O$_2$Cl$_2$ | 240 | 100 | 19.11 |

| (9) COMPONENT B PREPARATION | (10) | (11) | (12) | (13) | (14) |
|---|---|---|---|---|---|
| | | CATALYST COMPOSITION AND PERFORMANCES | | | |
| halog. metal % by wt. in B | Component A | Atomic ratio Al:Ti (V or Cr) | Productivity kg of PE/g of cat. | Activity g of PEg of Ti × hr × 0.9807 bar of C$_2$H$_4$ | Ex. |
| 5.3 | Al(Et)$_3$ | 475 | 45.0 | 242,600 | 1 |
| 0.9 | " | 2,801 | 2.0 | 63,500 | 2 |
| 2.5 | " | 1,009 | 6.5 | 74,300 | 3 |
| 3.0 | " | 841 | 9.0 | 86,000 | 4 |
| 2.0 | " | 882 | 27.0 | 386,000 | 5 |
| 3.0 | " | 588 | 15.6 | 148,500 | 6 |
| 3.2 | Al(iso-Bu)$_3$ | 237 | 64.0 | 571,000 | 7 |
| 3.2 | " | 237 | 19.68 | 175,700 | 8 |
| 0.8 | " | 951 | 19.6 | 700,000 | 9 |
| 4.0 | Al(Et)$_3$ | 669 | 15.6 | 39,000 | 10 |
| 1.0 | Al(iso-Bu)$_3$ | 191 | 9.36 | 267,000 | 11 |
| 2.0 | Al(Et)$_3$ | 1,370 | 10.0 | 50,000 | 12 |

We claim:

1. Process for the preparation of a catalyst which is active in the polymerization of gaseous ethylene at low pressure characterized by the steps of:

(a) providing a solution consisting of MgCl$_2$ dissolved in ethanol at a concentration of 100 to 300 g of MgCl$_2$ per liter of solution, having a water content not exceeding 5% by weight;

(b) spray drying said solution by spraying the latter into a flow of substantially anhydrous gaseous nitrogen having a purity of at least 99.9% and having an inlet temperature below 280° C. while controlling the flows of said nitrogen and of said solution so that the outlet temperatures of the gaseous mixture is by at least 40° C. lower than the inlet temperature and that the ethanol is not completely evaporated, to obtain MgCl$_2$ particles of spherical form and of a size in the range of from 3 to 100 microns with a residual alcoholic hydroxyl content of from 1.5% to 20% by wt., the solid MgCl$_2$ in said particles having an X-ray spectrum in which the maximum peak at 2.56 angstrom characteristic of crystalline MgCl$_2$ is practically absent and a new maximum peak at about 10.8 angstrom is present;

(c) reacting said MgCl$_2$ particles with a titanium halide, said halide being in the vapour or liquid form, optionally diluted with an inert, vaporizable solvent, at a temperature of from 20° C. to 100° C., the reaction time being in the range of from 2 to 60 minutes, while maintaining the weight ratio between the titanium halide and the MgCl$_2$ particles in the reaction zone in the range of from 0.001:1 to 2:1;

(d) recovering by physical means the reaction product particles when the latter contains from 0.7% to 12% by wt. (expressed as titanium) and on dry basis of titanium chemically linked to the solid;

(e) mixing the said reaction product particles with an organometallic compound selected from the group consisting of alkylaluminium or halides of alkylaluminium, in the same solvent used for the polymerization of ethylene, at room temperature and controlling the respective amounts so as to have in the mixture an atomic ratio between Al and Ti of from 100:1 to 5,000:1.

2. Process according to claim 1, characterised by providing a solution of MgCl$_2$ in ethanol containing in suspension microspheroidal particles of silica or alumina, said particles having a size of from 10 to 80 microns and being in a weight ratio with MgCl$_2$ of from 4:1 to 1:9.

3. Process according to claim 1, characterised by spraying said ethanolic solution of MgCl$_2$ into a flow of substantially anhydrous gaseous nitrogen which maintain in suspension a fluidized bed of silica or alumina particles having a size of from 10 to 80 microns, the nitrogen temperature being maintained in the range of from 130° to 220° C.

4. Process according to claim 1, characterised by spraying the said ethanolic solution of MgCl$_2$ into the said flow of nitrogen through a nozzle forming liquid droplets with a size in the range of from 0.5 to 70 microns, the gaseous nitrogen flowing in the same direction or in counter current with the said liquid droplets, while controlling the flows of said nitrogen and of said solution so that the outlet temperature of the gaseous mixture is from 130° to 210° C., the inlet temperature of the gaseous nitrogen being from 180° to 260° C.

5. Process according to claim 1, characterised in that the trialkylaluminium in step (e) has from 2 to 4 carbon atoms in the alkyl radical.

6. Process according to claim 1, wherein the titanium halide in step (c) is titanium tetrachloride in the form of vapor saturating an anhydrous gaseous nitrogen stream at room temperature flowing through a bed of the said MgCl$_2$ particles for a period of time of from 30 to 60 minutes.

7. Process according to claim 1, wherein the titanium halide in step (c) is titanium tetrachloride in liquid form.

* * * * *